United States Patent
Buri et al.

[11] Patent Number: 5,749,263
[45] Date of Patent: May 12, 1998

[54] TOOTHED-WHEEL GEARCHANGE

[75] Inventors: Gerhard Buri, Markdorf; Josef Bader, Friedrichshafen, both of Germany

[73] Assignee: ZF Friedrichshafen AG, Friedrichshafen, Germany

[21] Appl. No.: 492,124

[22] PCT Filed: Feb. 15, 1994

[86] PCT No.: PCT/EP94/00425

§ 371 Date: Aug. 10, 1995

§ 102(e) Date: Aug. 10, 1995

[87] PCT Pub. No.: WO94/19623

PCT Pub. Date: Sep. 1, 1994

[30] Foreign Application Priority Data

Feb. 19, 1993 [DE] Germany .................. 43 05 103.0

[51] Int. Cl.$^6$ .......................... F16H 3/093
[52] U.S. Cl. ................ 74/331; 74/333; 74/339; 192/108
[58] Field of Search ............. 74/325, 331, 339; 192/53.331, 53.4, 108, 114 T

[56] References Cited

U.S. PATENT DOCUMENTS

| | | | |
|---|---|---|---|
| 3,105,395 | 10/1963 | Perkins | 74/331 X |
| 3,419,120 | 12/1968 | Stott | 192/114 T |
| 4,069,903 | 1/1978 | Clements et al. | 192/114 T X |
| 4,098,381 | 7/1978 | Mueller et al. | 192/108 X |
| 4,192,196 | 3/1980 | Bogema et al. | 74/339 |
| 4,831,894 | 5/1989 | Braun | 74/745 |
| 4,905,806 | 3/1990 | Hillenbrand et al. | 192/108 X |
| 5,335,762 | 8/1994 | Raue | 74/339 X |
| 5,365,800 | 11/1994 | Muller | 74/333 |
| 5,390,560 | 2/1995 | Ordo | 74/331 X |
| 5,390,561 | 2/1995 | Stine | 74/331 |
| 5,547,057 | 8/1996 | Sperber | 74/339 X |

FOREIGN PATENT DOCUMENTS

| | | | |
|---|---|---|---|
| 539229 | 7/1955 | Belgium | 192/108 |
| 0 043 443 | 1/1982 | European Pat. Off. | |
| 0 390 368 | 10/1990 | European Pat. Off. | |

*Primary Examiner*—Khoi Q. Ta
*Attorney, Agent, or Firm*—Davis and Bujold

[57] ABSTRACT

A toothed-wheel gear change with power distribution over several layshafts (6, 7) having a radially and axially supported input shaft (2) and an output shaft (main shaft) (9) which is floating. At least one input gear (3, 4) provided on said input shaft (2) transmits the torque to gears (8) meshing therewith and firmly connected with the layshafts. The loose gears (10) are axially secured but radially free on the input and output shafts. A movable securing device (12, 13) makes possible the radial fixing of the input gear (3, 4).

19 Claims, 4 Drawing Sheets

TOOTHED-WHEEL GEARCHANGE

The invention concerns a toothed-wheel gear change with power distribution over several layshafts, a coaxial input shaft radially and axially supported and an output shaft (main shaft) which is floating, wherein at least one input gear provided upon the input shaft transmits the torque to gears meshing therewith and firmly secured to said layshafts, the loose gears being axially secured but radially free upon the input and output shafts.

In transmissions of this kind having at least two layshafts, the load compensation is in general such that the input shaft and the layshafts are rigidly supported with respect to the housing while the main shaft or output shaft is floating in the summation gears situated thereon which are in the power flow.

In the presence of two or more constants, the problem arises that in the case of several input gears the input gear not engaged requires radial play due to manufacturing tolerances. When a torque diminishes on a layshaft, radial and axial forces result in a helically cut meshing of teeth on the input shaft. To be able to absorb them, the gear that is in the power flow must be guided toward the input shaft.

Layshaft gear changes are generally designed in a manner such that the input shaft is firmly radially and axially supported while the main shaft or output shaft, on account of the required load compensation, is radially free and only axially fixed. But the inverse design or shaft mechanism is basically possible also.

All loose wheels on the input shaft and on the output shaft are only axially fixed but radially free for a functioning load compensation.

However, the necessary load compensation is disturbed, or an operation of the toothed-wheel gear change is not at all possible, when an asymmetrical intensity of force occurs. This is the case, for instance, when a power take-off has to be effected via one layshaft only. This means that the toothed-wheel gear change of the above mentioned kind is not suited to such a function.

This invention, therefore, is based on the problem of providing a toothed-wheel gear change of the kind mentioned above which also allows an asymmetrical intensity of force, especially one where a power take-off is also possible via one layshaft only.

According to the invention this problem is solved by the fact that the input gear is radially fixable by a movable securing device.

An asymmetrical force intensity or a one-sided output over one layshaft is possible by radially fixing or centering the input gear situated upon the input shaft without impairing the operating capacity of the toothed-wheel gear change.

The securing device will be advantageously coupled with the shifting device for the input gear.

In this manner, a shiftable radial fixing which makes possible two shifting positions is obtained. At least two input gears are generally present, but it is always only the input gear that has to be radially fixed for operating capacity. The respective other input gear must be radially free.

However, the number of shiftable fixings is not basically limited.

A simple, practical design of the securing device or of the ramp can consist in designing the ramps as a diameter reduction of the input gear beneath which an axial extension of the sliding sleeve is movable for the axial fixing.

By means of said design, a radial fixing of the input gear is simultaneously provided when coupling or connecting the torque of the input gear with the input shaft.

In order to obtain a perfect torque transmission and prevent tilting of the input gear, it can be provided that the diameter reduction extends axially beyond the center of meshing of the teeth.

A very advantageous further development of the invention consists in the securing device forming, at the same time, the torque-transmitting device.

The torque is transmitted from the input shaft to the layshaft in a manner known per se via a coupling gearing between the sliding sleeve and the input shaft. According to the invention, said gearing is now simultaneously used for the centering or radial fixing of the input shaft.

In a practical development for instance, this results from the securing device or the torque-transmitting device being situated in the area of the internal peripheral ring of the input gear.

In this case the ramp is practically obtained in the form of a diameter reduction of the internal peripheral ring of the input gear or of a corresponding diameter increase of the gearing situated upon the sliding sleeve.

The securing device or the torque-transmitting device will be here advantageously situated in the area of the axial center of meshing of the teeth whereby a perfect centering is given and tipping torques are prevented.

In an advantageous further development of the invention, it can be provided that the selector gears have tooth flanks conically tapering on both sides.

This design assists the axial fixing of the input gear under torque load. In practice, taper angles of more than 3° have proved especially advantageous.

The clutch gearing between input shaft and sliding sleeve can be distributed in different areas. Said different areas each have different base tangent lengths. Two different base tangent lengths are preferably provided. They are preferably on the input shaft. The different areas with different base tangent lengths prevent the automatic disengagement of the sliding sleeve from the currently selected shift position.

The securing device is movable in both axial directions or interacts with two input gears.

Two embodiments of the invention are fundamentally described herebelow with reference to the drawings. In the drawings.

Figure 1:
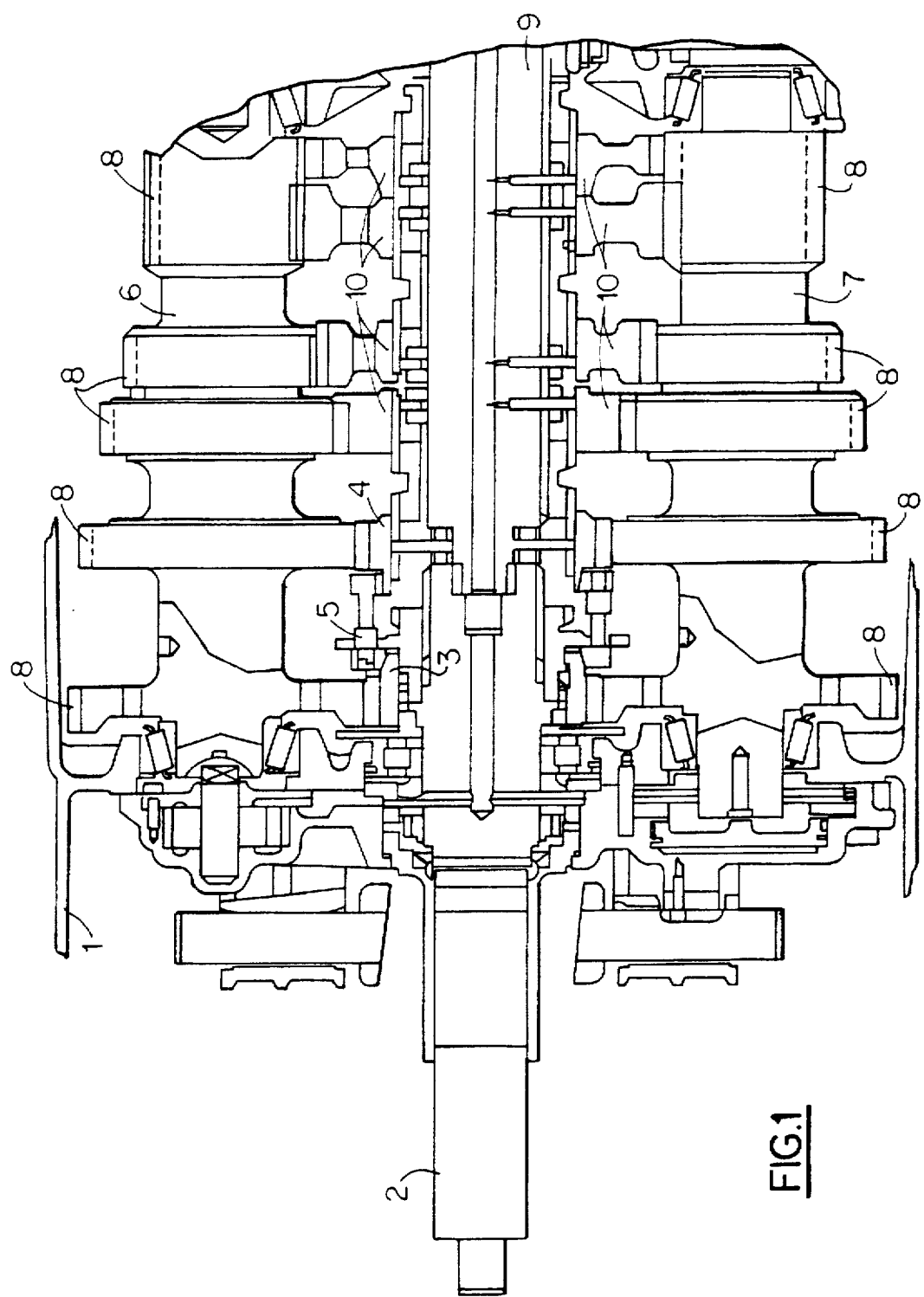
FIG. 1 is a total view of the toothed-wheel gear change.

The toothed-wheel gear change has a construction basically known per se wherefore only the parts essential to the invention will be discussed in detail herebelow.

An input shaft 2 supported in a housing 1 is connectable with two input gears 3 and 4, for torque transmission, via a shifting device 5. The input gears 3 and 4 are in tooth contact with gears 8 firmly connected to the layshafts 6 and 7.

As known per se, part of the gears 8 are in tooth contact with loose gears 10 situated on an output shaft 9. The output shaft or main shaft 9 is floating.

In order to make possible a power take-off, not shown here, on the layshaft 6 and the one-sided load decrease on the layshaft 6 connected therewith, a securing device is provided for a radial fixing of the engaged input gear. Actually, both input gears 3 and 4 are normally situated with radial play upon or above the input shaft 2.

Figure 2:
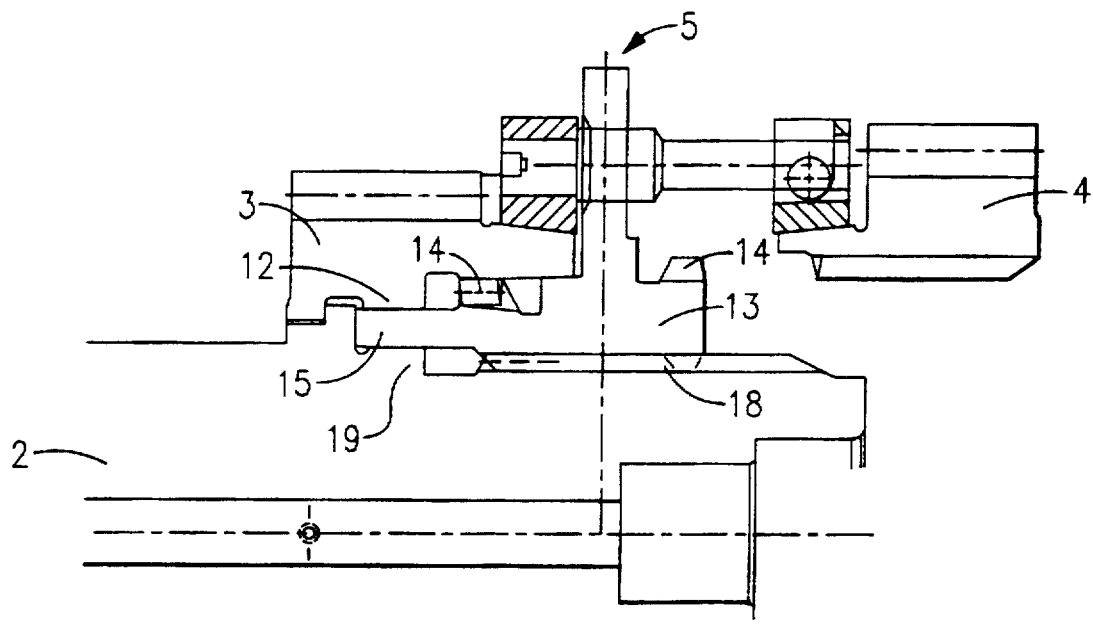
FIG. 2 is a sectional enlargement of the area with the input gears and a securing device according to the invention.

According to the embodiment of FIG. 2, the input gear 3 has a diameter reduction in the form of a ramp 12 on its internal peripheral ring. The diameter reduction or ramp 12 extends from the side of the input gear 3 facing the sliding sleeve 13 of the shifting device to the center or somewhat beyond the center of the input gear 3. The sliding sleeve 13 is guided with scarce play on the input shaft 2 and is connected therewith by gearing 18. The area 19 of the input shaft 2 opposite to the ramp 12 of the input gear 3 is likewise designed in the form of a ramp.

The shifting device 5 is provided, in a manner known per se, with a clutch or gear-shifting gearing 14 for each one of the two input gears 3 and 4. The sliding sleeve 13 is provided with an axial extension 15. The axial extension 15 projects, with play, beneath the input gear 3, the forward end of which terminates before the ramps 12 and 19 in a neutral position, that is, not engaged.

If in the usual manner, the shifting device 5 is moved in axial direction, such as to the left, by a shifting fork not shown here, then the axial extension 15 of the sliding sleeve 13 moves between the ramp 12 of the input gear 3 and the ramp 19 of the shaft 2. The diameter ratios between the outer diameter of the axial extension 15 and the inner diameter of the ramp 12, the same as between the inner diameter of the extension 15 and the outer diameter of the ramp 19, are selected so that the axial extension 15 is inserted playfree between the ramps 12 and 19. In this manner, during the shifting operation of the shifting device 5 and the coupling combined therewith of the input gear 3, the input gear 3 is simultaneously radially guided. Via the ramps 12, 15 the input gear 3 is centered or fixed relative to the sliding sleeve 13 which is centered or fixed relative to the input shaft 2 via the ramps 15, 19.

Figure 3:
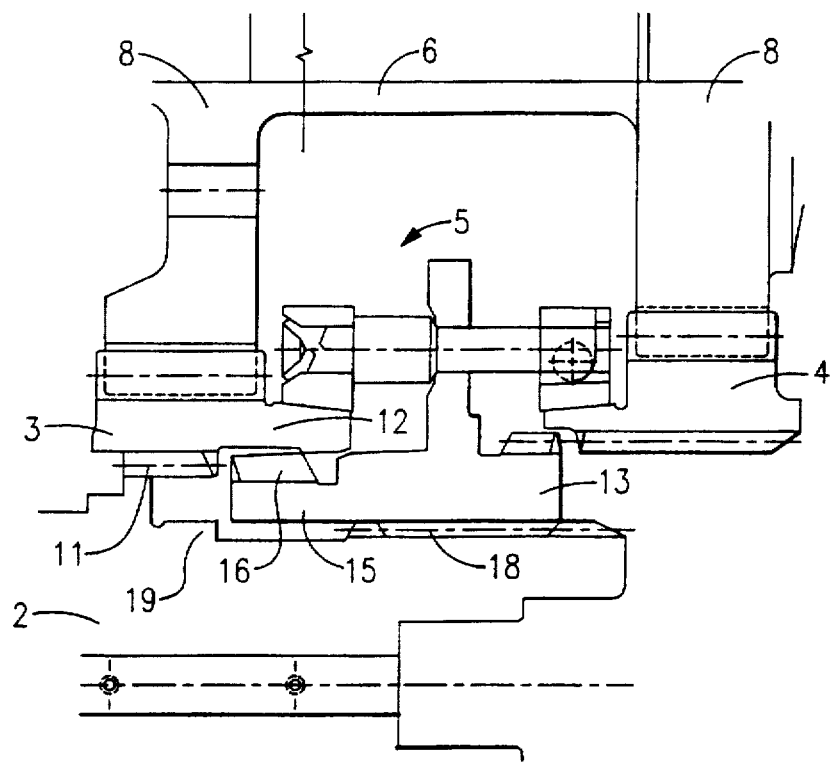
FIG. 3 is a sectional enlargement of the unengaged input gears with a securing device of a different type of construction.
Figure 4:
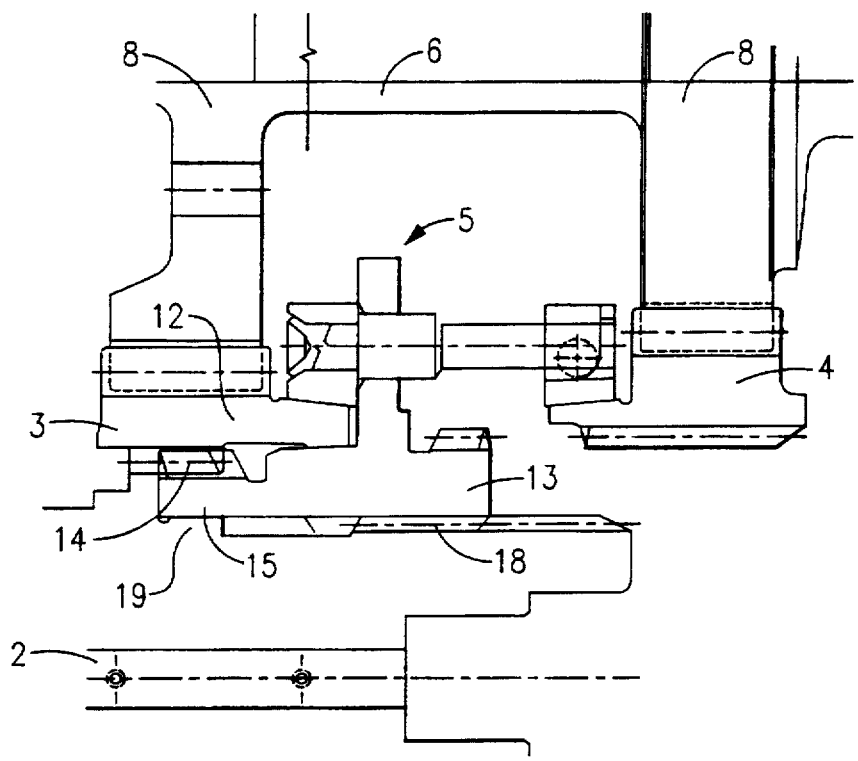
FIG. 4 is an engaged enlargement according to FIG. 3.

In FIG. 3 and 4 another embodiment of a securing device is shown. But it has basically the same design as the above described securing device. The essential difference consists in that the securing device forms, at the same time, the torque-transmitting device, or that both devices are combined to form a unit.

As can easily be understood from FIG. 3, the input gear 3 likewise has a diameter reduction in the form of a ramp 12 in its internal peripheral ring. The shaft 2 similarly has a ramp 19. The sliding sleeve 13, in turn, is insertable between said ramps 12 and 19 by a corresponding extension or as a result of its particular configuration. But unlike in the embodiment of FIG. 2, the torque-transmitting device is, at the same time, provided in the area of the ramp 12 in the form of the selector gearing known per se. For this purpose, the ramp 12 has a corresponding toothed ring 11 and the sliding sleeve 13 a corresponding ring gear 16 on its outer periphery.

In FIG. 3 the position of the shifting device, in an unengaged state of an input gear, is shown in the first place while the embodiment illustrated in FIG. 4 shows the position of the input gear 3 in an engaged state whereby, as can be seen, the radial centering of the input gear and the torque connection are produced. For this purpose, the diameter ratios of the toothed ramp 12 of the sliding sleeve 13, in the area where it meshes with the ramp 12, and the parts of the selector gearing, toothed ring 11 and gear ring 16, are adequately adapted to each other so that no radial play exists between said parts.

In the arrangement of FIG. 3 and FIG. 4, the radial fixing can be divided in two components wherein the centering operation is assumed on one by the profile thickness of the selector gearing 14, 11, 16 and of the gearing 18 and on the other by the ramps 12, 15 and 15, 19.

Figure 5:
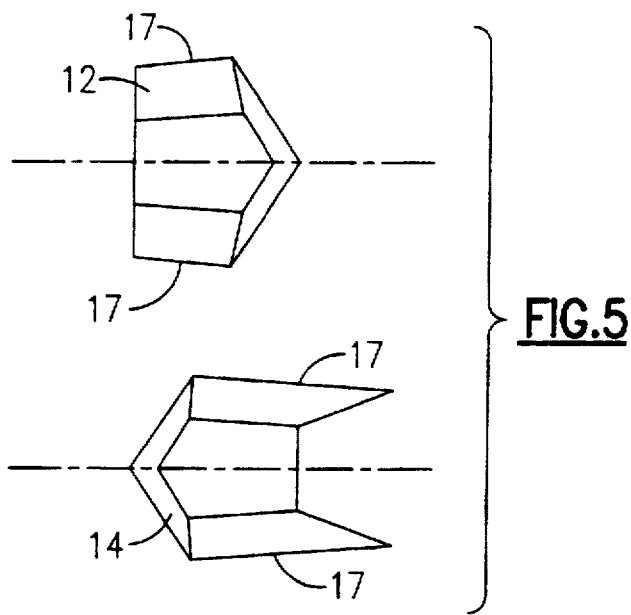
FIG. 5 is an enlarged top view of a basic illustration of the gears of the securing device.

As can be understood from FIG. 5, the tooth flanks 17 of the teeth of the selector gearing 14 and of the toothed ramp 12 conically taper on both sides. Said conical selector gearing assists the axial movement and the meshing of the sliding sleeve under torque load. The taper angle can amount to 3.5°, for instance.

The sliding sleeve 13 can also be designed so as to have extensions 15 on both sides which correlate with ramps 12 both on an input gear 3 and on an input gear 4. Corresponding ramps 19 are then also provided on the shaft 2 in the area of the input gears.

Figure 6:
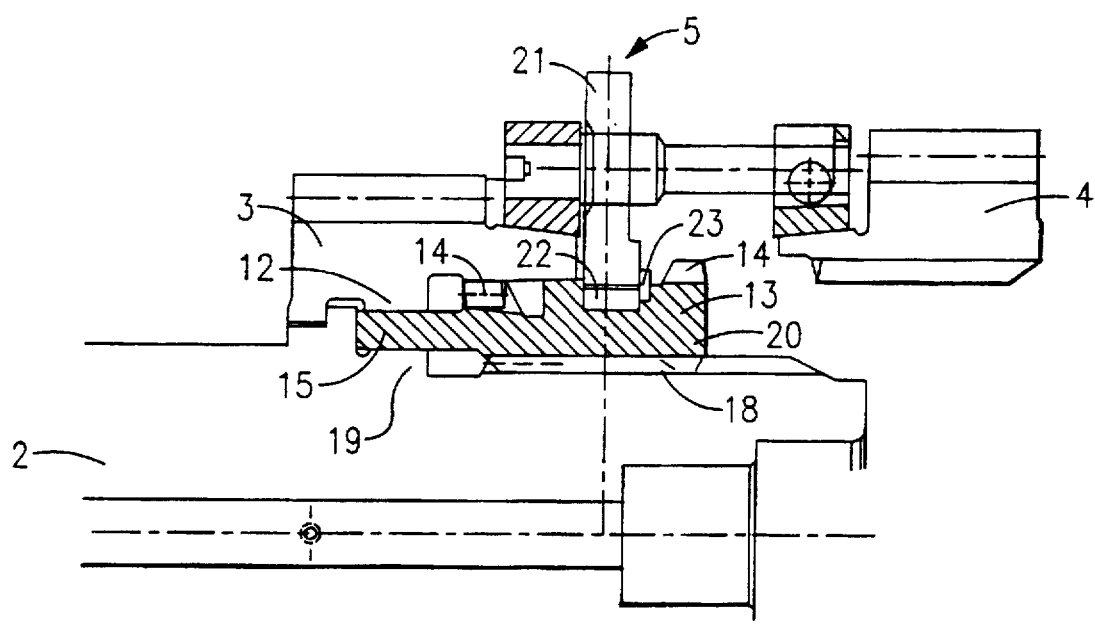
FIG. 6 is an embodiment of the sliding sleeve.

Another advantageous design of the sliding sleeve 12 is shown in FIG. 6.

Here the sliding sleeve 13 is divided in two parts. A first part 20 has the selector gearing 14 for torque transmission and the axial extension 15 for fixing the input gear 3. The second part 21 is positively connected with the first part 20. The second part 21 contains parts of a synchronizing device, known per se and not described in detail here. The positive locking between both parts 20 and 21 can be obtained by a gearing 22, for instance. Both parts 20 and 21 can be axially secured to each other by a snap ring situated in a perforation in part 21 and meshing with a perforation in part 20. The part 21 also can axially abut against a projection of the part 20 and be axially secured by a snap ring 23 which, on the side of the part 21 opposite the projection, meshes with a perforation of the part 20.

| Reference numerals | | | |
|---|---|---|---|
| 1 | housing | 14 | selector gearing |
| 2 | input shaft | 15 | axial extension |
| 3 | input gear | 16 | gear ring |
| 4 | input gear | 17 | tooth flank |
| 5 | shifting device | 18 | gearing |
| 6 | layshaft | 19 | ramp |
| 7 | layshaft | 20 | sliding sleeve part |
| 8 | gear | 21 | sliding sleeve part |
| 9 | main shaft | 22 | gearing |
| 10 | loose gear | 23 | snap ring |
| 11 | toothed ring | | |
| 12 | ramp | | |
| 13 | sliding sleeve | | |

We claim:

1. A toothed-wheel gear change having a radially and axially supported input shaft and a coaxial and floating output shaft and having a power distribution over a plurality of countershafts, at least one input gear being provided on said input shaft for transmitting torque to gears meshing therewith and firmly connected with said plurality of countershafts, and said torque being transmitted to loose gears being axially fixed but being radially freely movably situated on said output shaft, and said torque being transmitted to said output shaft by way of a respective coordinated coupling device;

wherein said at least one input gear is provided on said input shaft, for torque transmission, as an axially fixed and radially freely movable loose gear (3), said at least one input gear is coupled with said input shaft by a shifting device (5) and said at least one input gear is radially fixed, upon engagement of said at least one gear, by a movable securing device (12, 15, 19) which is at least partially located, during said coupling, between said at least one gear and said input shaft.

2. A toothed-wheel gear change according to claim 1, wherein said securing device (12, 15, 19), for said input gear (3, 4), is coupled with said shifting device (5).

3. A toothed-wheel gear change having a radially and axially supported input shaft and a coaxial and floating output shaft and having a power distribution over a plurality of countershafts, at least one input gear being provided on said input shaft for transmitting torque to gears meshing therewith and firmly connected with said plurality of countershafts, and said torque being transmitted to loose gears being axially fixed but being radially freely movably situated on said output shaft, and said torque being transmitted to said output shaft by way of a respective coordinated coupling device;

wherein said at least one input gear is provided on said input shaft, for torque transmission, as an axially fixed and radially freely movable loose gear (3), said at least one input gear is coupled with said input shaft by a shifting device (5) and said at least one input gear is radially fixed by a movable securing device (12, 15, 19);

said securing device (12, 15, 19) for said input gear (3, 4), is coupled with said shifting device (5); and a ramp (12, 19) is provided on at least one of a sliding sleeve (13) of said shifting device (5) and said securing device (12, 15, 19).

4. A toothed-wheel gear change according to claim 3, wherein said sliding sleeve (13) is coupled with a ramp (12) carried by said input gear (3, 4).

5. A toothed-wheel gear change according to claim 4, wherein said ramp (12) is formed as a reduction in diameter of said input gear (3, 4) and an extension (15) of said sliding sleeve (13) is movable for radial fixing said at least one input gear.

6. A toothed-wheel gear change according to claim 5, wherein said reduction in diameter extends axially beyond a center of a tooth contact.

7. A toothed-wheel gear change according to claim 1, wherein said securing device (12, 15, 19) also forms a torque-transmitting device (14).

8. A toothed-wheel gear change according to claim 7, wherein at least one of said securing device (12, 15, 19) and said torque-transmitting device (14) is situated on an inner peripheral area of said input gear (3, 4).

9. A toothed-wheel gear change according to claim 8, wherein at least one of said securing device (12, 15, 19) and said torque-transmitting device (14) lies in an area of an axial center of a tooth contact.

10. A toothed-wheel gear change according to claim 7, wherein said torque-transmitting device (14) is provided with tooth flanks (17) which conically taper on two sides.

11. A toothed-wheel gear change according to claim 10, wherein the angle of tapering of said tooth flanks (17) is at least 3°.

12. A toothed-wheel gear change according to claim 1, wherein said securing device (12, 15, 19) is at least one of movable in both axial directions and interacting with two said input gears (3, 4).

13. A toothed-wheel gear change according to claim 1, wherein a clutch gearing (18), having areas of different base tangent lengths, is provided between said input shaft (2) and said sliding sleeve (13).

14. A toothed-wheel gear change according to claim 13, wherein said areas of different base tangent lengths are situated on said input shaft (2).

15. A toothed-wheel gear change according to claim 3, wherein said sliding sleeve (13) comprises first and second parts and said second part (21) supports components of a synchronizing device.

16. A toothed-wheel gear change according to claim 15, wherein said sliding sleeve (13) supports said securing device (12, 15, 19) and said torque transmitting device (14) and said second part (21) are secured to one another by a snap ring (23).

17. A toothed-wheel gear change according to claim 15, wherein said first and second parts (20, 21) of said sliding sleeve (13) are positively interconnected.

18. A toothed-wheel gear change according to claim 15, wherein a snap ring (23) axially secures said first and second parts (20, 21) to one another.

19. A toothed-wheel gear change according to claim 15, wherein said positive interconnection is accomplished by a gear.

* * * * *